United States Patent [19]
Schutte et al.

[11] 3,869,543
[45] Mar. 4, 1975

[54] METHOD FOR DECOMPOSING CONCENTRATED AQUEOUS ALUMINUM NITRATE SOLUTIONS

[75] Inventors: August H. Schutte, Lexington; James T. Stevens, Bedford, both of Mass.

[73] Assignee: Arthur D. Little, Inc., Cambridge, Mass.

[22] Filed: Mar. 18, 1971

[21] Appl. No.: 125,758

[52] U.S. Cl. .................. 423/390, 423/631, 23/284, 23/260
[51] Int. Cl. ....... C01b 21/42, C01f 7/30, B01j 1/00
[58] Field of Search ............................ 423/631, 390

[56] References Cited
UNITED STATES PATENTS
2,586,818 2/1952 Harms ........................... 23/1 F UX
2,726,140 12/1955 Miller ................................ 423/51
3,647,373 3/1972 Hoska et al. .......................... 23/142

*Primary Examiner*—M. Weissman
*Attorney, Agent, or Firm*—Bessie A. Lepper

[57] ABSTRACT

Method for thermally decomposing an aqueous aluminum nitrate solution to form alpha-alumina and nitric acid in a fluidized bed using steam and decomposition products as fluidizing gases and a circulating heat transfer fluid to heat the bed particles. The most economical fuel source may be employed, and no noncondensible products of combustion must be removed from the effluent nitric acid and water vapor. In a preferred embodiment the effluent off-gases from one fluidized bed are used as the fluidizing gas for one or more additional fluidized beds.

10 Claims, 8 Drawing Figures

METHOD FOR DECOMPOSING CONCENTRATED AQUEOUS ALUMINUM NITRATE SOLUTIONS

This invention relates to the production of pure alumina for reduction to aluminum metal and more particularly to the production of alumina from aluminum nitrate solutions with the recovery of a significant portion of the nitrate values in the form of nitric acid.

A process (see U.S. Pat. No. 3,211,524) has been developed which described the recovery of high purity alumina from aluminum-bearing clays. In this process the clay is calcined, leached with concentrated nitric acid, and subsequent to the removal of all impurities from the aluminum nitrate solution it is thermally decomposed at from about 300° to 600°C to form alumina of a purity sufficient to permit its reduction by the Hall process. Decomposition within this temperature range produces satisfactory alumina, but it also decomposes the nitrate to the oxides of nitrogen which then require expensive processing to be reconverted to nitric acid.

An improved process for hydrolyzing an aqueous aluminum nitrate solution is described in U.S. Ser. No. 768,111 filed Oct. 16, 1968, in the names of Paul A. Huska, Herman P. Meissner and Thomas J. Lamb (now U.S. Pat. No. 3,647,373) and assigned to the same assignee as the present application. In this improved process a concentrated aluminum nitrate solution is introduced into a fluidized bed maintained at a temperature between about 150° and 300°C. The water vapor content of the gases in the fluidized bed is controlled in a manner to remove up to 95 percent of the nitrate values from the aluminum nitrate as nitric acid rather than as oxides of nitrogen which must be converted to nitric acid. In Ser. No. 768,111 there is disclosed a modification of the process and apparatus in which the bed particles are preheated in a separate heater (See FIG. 3 of that disclosure) and then transferred to the bed in which the decomposition and hydrolysis take place. In this modification it is possible to essentially separate the nitric acid/water effluent withdrawn from the hydrolyzing fluidized bed from the noncondensible gases in the heater. However, some of the nitrate values residing in the solid product from the hydrolyzing reactor are carried over into the heater where these values are decomposed and the oxides of nitrogen thus formed are carried out with the combustion gases and are lost due to their concentration which is too low to warrant economic recovery. In operating either a fluidized bed or a heater on combustion gases for production of pot feed alumina, it is necessary to use a clean burning gaseous fuel such as natural gas to avoid contaminating the alumina by direct contact with the impurities in the combustion gas. The use of natural gas for direct combustion in the fluidized bed not only presents problems in the separation and removal of noncondensibles, but it is now apparent that it may become uneconomical to use natural gas as an industrial fuel because of its rising costs. It would therefore be desirable to have a method and apparatus for hydrolyzing and decomposing aqueous aluminum nitrate solutions which eliminated the need to handle large quantities of noncondensible gases and freed the process from the use of natural gas.

In U.S. Ser. No. 768,111 it is pointed out that it is possible to heat aluminum nitrate in a manner to avoid extensive decomposition to the nitrogen oxides, and instead to hydrolyze the nitrate and drive off the major portion of the nitrate values as nitric acid vapor which requires only condensation for recycling. In such heating, the higher the temperature the more rapidly the hydrolysis occurs. However, the higher the temperature the more nitrate is again decomposed to the oxides of nitrogen. As the hydrolysis process is continued, especially at the lower temperatures, a solid forms, the structure of which is not precisely known. This material is extremely difficult to handle inasmuch as it takes on a sticky, glue-like consistency which has a tendency to adhere to all surfaces with which it comes in contact. Moreover, difficulties of handling increase with increasing concentration so that it has not been possible heretofore to remove a major portion of the nitrate values from it. Thus, it has been possible to show in laboratory experiments that the hydrolysis and concentration of aluminum nitrate solutions, under certain conditions, can lead to the direct formation of nitric acid and a solid material. There was, however, no known method in the prior art prior to the teaching in Ser. No. 768,111 for decomposing an aluminum nitrate solution so that substantially all of the nitrate values can be recovered in the form of nitric acid while producing a satisfactory solid product which can be further processed.

There are in the prior art several patents directed to the processing of aluminum nitrate solutions using steam. One of these patents (U.S. Pat. No. 1,412,754) teaches adding steam to a relatively dilute solution of aluminum nitrate containing other soluble nitrates, such as those of sodium and calcium, to maintain it at a temperature of about 140°C to crystallize a basic nitrate material which is then separated by filtration. Thus, the nitrate values are eventually divided among the overhead gases, the liquor and the filtrate. German patent No. 528,795 teaches the thermal decomposition of aluminum nitrate to form alumina and nitric acid under an absolute pressure of 200 mm by passing steam or hot water through it to maintain it at about 100°C.

U.S. Pat. No. 2,127,504 disclosed melting crystals of the ennea-hydrate of aluminum nitrate, driving off 20 to 35 percent of the available nitric acid along with water vapor, and then treating this mass with steam introduced below the surface to maintain it at between 140° and 145°C. After this treatment, a suitable quantity of cooled saturated nitrate solution containing some basic nitrate is added to the molten material to lower the temperature to between 60° and 90°C. Under these circumstances a basic nitrate is precipitated and may be separated by centrifuging.

Finally, U.S. Pat. No. 2,737,445 teaches the heating of concentrated aluminum nitrate solutions on a surface heated to a temperature of about 190°C in a partial vacuum in which the gas phase is steam. This prior art process assumes that under these conditions the nitrate decomposes to form $N_2O_5$ which is reacted with the excess steam to form nitric acid. One of the requirements of this process is that the heating be above the temperature of the decomposition of the nitrate to effect this process. At least two practical difficulties are encountered in such a process, namely a severe limitation on the amount of heat which can be transferred to the solutions which in turn limits the rate of product formation per unit of equipment; and the necessity to provide a partial vacuum.

The difficulties encountered in the prior art processes as described are overcome in the method of Ser. No. 768,111 and in the method of this invention by introducing the concentrated aluminum nitrate solution into a fluidized bed which is maintained at a temperature between about 150° and 300°C and preferably between about 200° and 210°C. The necessity to handle noncondensible gases is eliminated in the method of this invention by using steam and products of the solution decomposition as the fluidizing gases; and a heat transfer fluid circulated in tubings within the bed makes it possible to eliminate the use of natural gas (or other clean-burning gaseous fuel) and substitute such fuels as coal or fuel oil to heat the heat transfer fluid in separate furnaces. In a preferred arrangement three or more fluidized beds are operated in parallel with respect to the introduction of the concentrated aqueous feed solution and in series/parallel with respect to the fluidizing vapor flow.

Under these conditions the aluminum nitrate is converted to a dry solid adhering to the particles fluidized in the bed, or a dry, friable powder both of which are apparently hydrolyzed aluminum nitrate containing as little as 5 percent nitrate, depending upon the residence time of the solids in the bed. The nitrate in the feed leaves the fluidized bed primarily as nitric acid vapor prior to recycling. Only a small amount of noncondensible oxides of nitrogen need be removed. The dry solid product from the fluidized bed is then heated to drive off water and any remaining nitrate values to form α-alumina.

The conversion of the aluminum nitrate solution to alumina by the process of this invention, which includes as a first step the introduction of the solution into a fluidized bed maintained within specified controlled condition, maintains the system isothermal at optimum conversion temperature and eliminates the handling of any sticky, semi-solid material.

There is in the prior art the teaching of the use of an indirectly heated fluidized bed to decompose an aqueous solution of aluminum nitrate-nitric acid to alumina and oxides of nitrogen using fluid bed temperatures of about 550°C. (See for example "Development of a Fluidized Bed Calcination Process for Aluminum Nitrate Wastes in a Two-Foot-Square Pilot Plant Calciner" IDO—14627, June 1964, available from the Office of Technical Services, U.S. Department of Commerce and prepared by Phillips Petroleium Company, Atomic Energy Division.) There is also in the prior art teaching of the use of an indirectly heated fluidized bed to decompose $Mn(NO_3)_2$ into $MnO_2$ and $HNO_3$ using steam and air. (See U.S. Pat. Nos. 2,714,550 and 2,726,140.)

None of this prior art, however, provides a solution to the combination of problems faced and solved by applicants, namely to provide a method and apparatus for decomposing a concentrated (preferably 56.7 percent by weight) aqueous solution of aluminum nitrate to form alumina, nitric acid, water, and a minimum quantity of oxides of nitrogen without having to process large quantities of noncondensible gases which are other than the oxides of nitrogen. Moreover, the method and apparatus of this invention make possible the use of low cost fuel and, in eliminating the need to handle large quantities of condensible gases, reduce the processing cost and equipment costs, all of which make possible reductions in cost of the alumina thus produced.

It is therefore a primary object of this invention to provide an improved method for converting an aqueous aluminum nitrate solution to alumina in a manner to recover a substantial portion of the nitrate values as nitric acid while eliminating the need to separate and remove any appreciable quantity of noncondensible gases from this by-product nitric acid. It is another object of this invention to provide a method of the character described which may be continuous in operation, which makes it possible to use the maximum concentration of aluminum nitrate in the feed solution, and which produces a material presenting no handling problems. It is yet another object of this invention to provide such a method which achieves the conversion of solutions of aluminum nitrate to alumina using low cost fuels, requiring a minimum amount of energy input and presenting a minimum amount of materials handling problems. It is another primary object of this invention to provide improved apparatus for decomposing and converting an aqueous aluminum nitrate solution to alumina to recover a substantial portion of the nitrate values as nitric acid while the decomposition products remain free from noncondensible gases which are other than a relatively small amount of oxides of nitrogen and at the same time to economically recover small amounts of oxides of nitrogen formed during the decomposition. An additional object is the provision of apparatus of the character described which makes possible the use of low cost fuel. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a longitudinal cross section of a fluidized bed suitable for the practice of this invention;

In the method of this invention a concentrated aqueous aluminum nitrate feed solution is preferably delivered in the form of atomized spray beneath the surface of a fluidized bed, the particles of which are heated by indirect heat exchange with a heat exchange fluid circulating in a number of tubes within the bed. In some cases it may be possible to inject the aqueous aluminum nitrate feed solution into the bed as a continuous liquid stream, relying upon the interaction of the fluid stream with the bed particles to break up the feed into droplets. The fluidizing gases are steam and gaseous products of decomposition, i.e., nitric acid vapor and water vapor (steam) with a small amount of nitrogen oxides. As will be seen in the description of the figures, some external steam must be applied, but this may, if desired, be kept to a minimum by using the gaseous decomposition products from one fluidized bed unit as the fluidizing gases for one or more fluidized beds arranged in series with it.

The feed solution used is preferably that prepared by dissolving pure crystals of aluminum nitrate nonahydrate in their water of crystallization. This is done by heating the crystals to about 80°C and results in the most concentrated solution practical, i.e., 56.7 percent by weight. The crystals are preferably formed by the method described in a copending application Ser. No. 125,757 filed Mar. 18, 1971 in the names of Paul A. Huska and Herman P. Meissner and assigned to the same assignee as the present application.

In decomposing aluminum nitrate to alumina it is necessary to maintain the heating conditions so that a minimum amount of nitrogen oxides forms and so that no appreciable quantity of an hydrolysis product forms which is sticky. In the first case, minimizing the amount of nitrogen oxides minimizes the cost of recovering nitric acid; while in the second case elimination of a sticky hydrolysis product makes it possible to achieve the optimum heat transfer from the heat transfer liquid through the tubing walls to the bed particles as well as from the bed particles to the aluminum nitrate solution contacting their surfaces. These requirements for minimizing nitrogen oxide formation and maximizing heat transfer within the bed call for temperature control and heat distribution. The fluidized bed shown in cross section in FIG. 1 is illustrative of fluidized bed apparatus capable of meeting these requirements.

Figure 1:
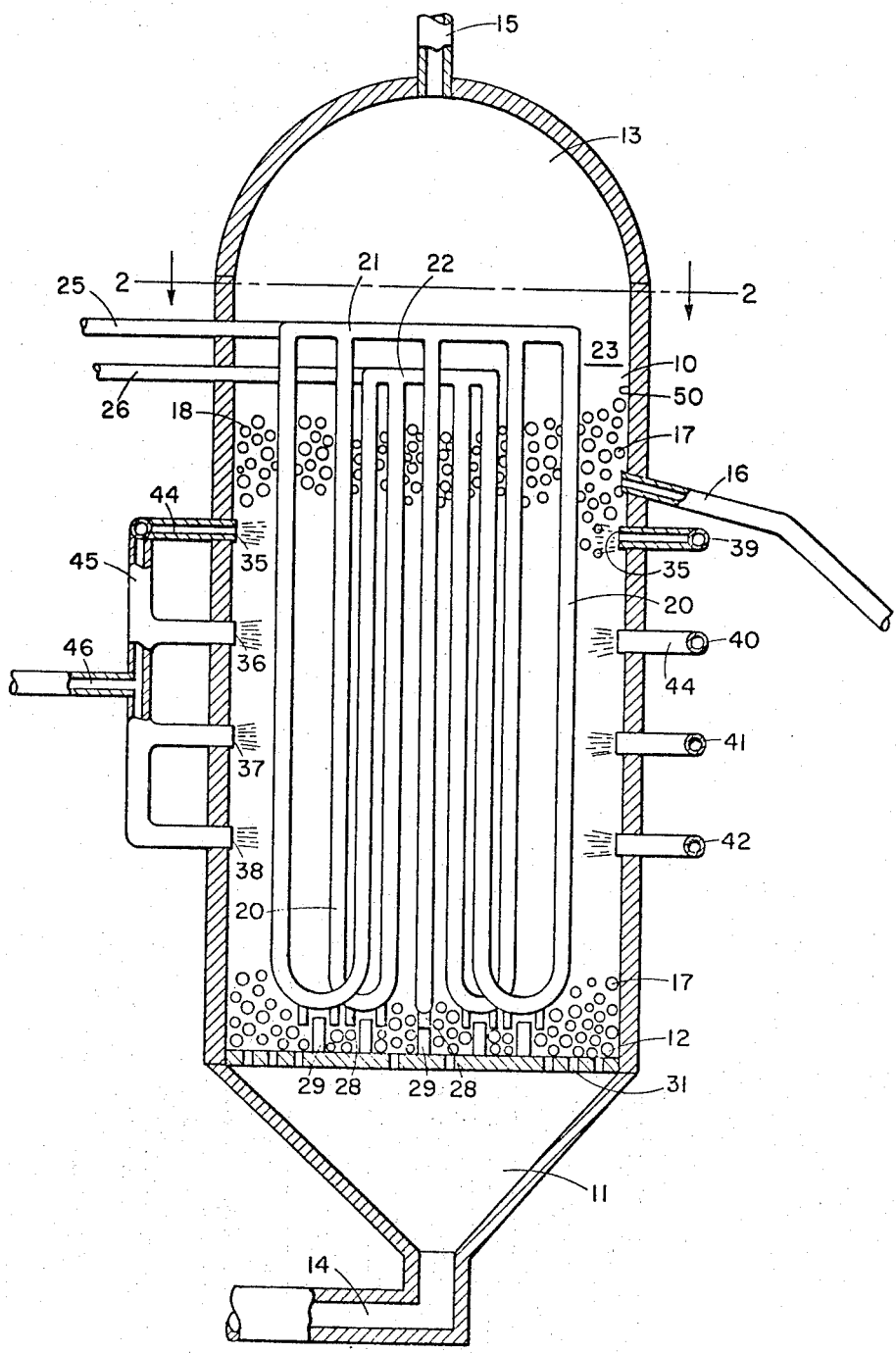

In keeping with known fluidized bed practice, the fluidized bed of FIG. 1 is formed of a central reaction chamber section 10, a fluidizing gas chamber 11, separated from the reaction chamber by a foraminous grid plate 12, and an overhead effluent fluid chamber 13. Fluidizing gas is introduced into the bed through the gas chamber 11 by means of a gas line 14 and the effluent gases are withdrawn from the bed through a discharge line 15 along with very fine product material. The main product discharge means is an overflow pipe or downcomer conduit 16. In decomposing aluminum nitrate the bed particles 17 are preferably alumina, but may be basic aluminum nitrate or any other suitable inert solid particles. It will, of course, be appreciated that the fluidized bed particles 17 extend from the grid plate 12 to the top of the bed surface 18, and that the entire bed is not illustrated in FIG. 1 to simplify the drawing.

Figure 2:
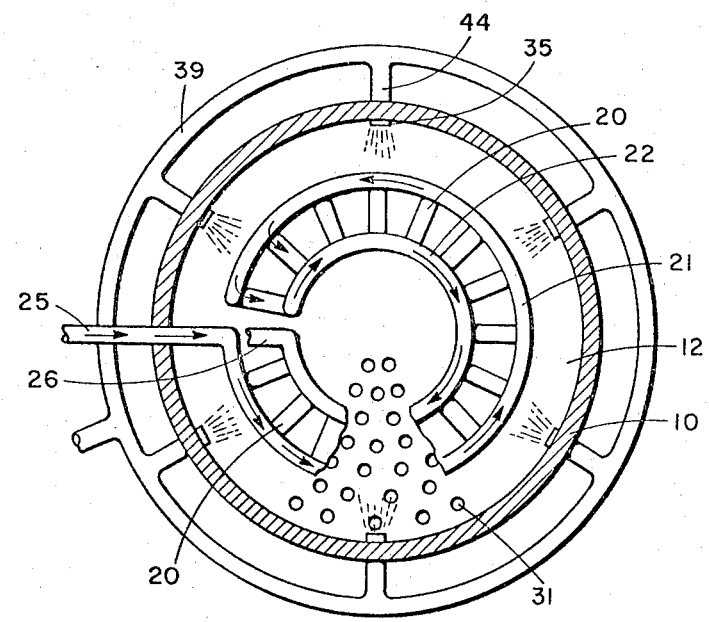
FIG. 2 is a cross section of the fluidized bed taken along line 2—2 of FIG. 1.
Figure 3:
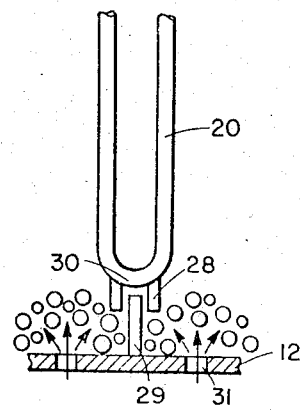
FIG. 3 is a detail of the bottom end of one of the U-tubes used in circulating a heat-transfer fluid.

As will be seen in FIGS. 1 and 2, a plurality of U-tubes 20 are used to circulate the heat transfer fluid for heat exchange with bed particles 17. These U-tubes are supported at the top by a circular inlet header 21 and circular outlet header 22 located in the freeboard zone 23 above the bed surface 18. An inlet conduit 25 for the heat transfer fluid is connected to inlet header 21; and a discharge conduit 26 is connected to outlet header 22. Each of the U-tubes 20 is supported at the bottom by a guide sleeve 28 which forms a very loose engagement with a guide pin 29 welded to the grid plate to compensate for dimensional variations brought about through thermal expansion and contraction of the tubing material. As will be seen in the detail of FIG. 3, the bottom bend 30 of the U-tubes must be spaced above the grid plate and the openings 31 of the grid plate must be so located relative to the bottom bend 30 of the U-tube so that there is no direct short-range impingement of the fluidizing gases on the U-tube bends. It is, of course, within the scope of this invention to use more than one inlet and outlet headers, to vary the shape of the tubes and the design of the means by which they are anchored to the grid plate.

The concentrated aqueous aluminum nitrate solution is introduction as atomized spray into the bed below its surface 18. This is done through a series of nozzle banks as illustrated in FIGS. 1 and 2. For purposes of illustration FIG. 1 shows four banks 35, 36, 37 and 38 of peripherally spaced nozzles adapted to deliver atomized feed solution beneath the surface of the bed at four different heights. These nozzles may be of the high-pressure atomizing type or of the two-phase type adapted to provide high-pressure steam with the liquid feed solution. A preferred liquid feed system for coupling the nozzles to feed lines outside the bed housing to prevent fluid leakage into the bed and to insure optimum distribution of the atomized droplets into the bed is described in copending application Ser. No. 13,904 filed Feb. 25, 1970, in the names of Ravindra Nadkarni, Frank J. Tremblay and Charles L. Kusik (now U.S. Pat. No. 3,625,427) and assigned to the same assignee as the present application. Each nozzle is connected to a circular manifold 39, 40, 41 or 42 through a short feed line 44, and the circular manifolds in turn are all connected to a vertical manifold 45 which in turn is connected to a main liquid feed line 46 communicating with a feed supply through a suitable pump.

In order to prevent direct impingement of the atomized feed liquid upon the walls of tubing 20, sufficient spacing is maintained between the inner wall 50 of the housing of the reaction chamber section 10 and the outermost tubes 20 to permit a sufficiently deep layer of bed particles to isolate all of the tubing walls from direct feed spray as shown for the upper righthand nozzle 35 in FIG. 1. The tubing sections should be relatively closely spaced to provide the heat thransfer surface (outer tubing walls) in a reasonable volume of fluid bed and to maintain a short travel distance of gases and bed particles between reheating contacts with the tube surfaces.

The presence of the tubings within the fluidized bed make possible the use of a deeper bed than would normally be possible. For example, 30 feet deep beds, normally not practical from the standpoint of gas-solid contacting and bubble formation in an open bed having an outside diameter of about 24 feet, can be used with the tubings present and with the decomposition gases serving as the fluidizing gases. Initial fluidization as well as any supplemental fluidization may be provided by supplying steam.

It is necessary to operate the fluidized bed under controlled conditions in order to obtain the objects of the method of this invention. Among the important operational parameters are the fluidized bed temperature, water vapor content, physical characteristics of the bed particles, average residence time of the particles in the bed and residence time of the nitric acid vapor in the bed.

In the fluidized bed it is necessary to maintain the particles at a temperature such that when the aluminum nitrate feed stock is atomized onto their surfaces, the liquid is substantially instantaneously dried, the temperature of the feed stock and dry product being raised to between about 150° and 300°C. Generally, for reasons of economics, it is preferred that the temperature range between 200° and 210°C. Temperatures which are materially below 200°C do not effect sufficient removal of the nitrate while those materially in excess of 210°C bring about excessive decomposition of the nitrate to the oxides of nitrogen. This in turn materially increases the cost and the amount of equipment required to convert these oxides of nitrogen to nitric acid for recycling. When operating continuously so that residual nitrate values in the solid product overflow are about 5 percent, then the remaining nitrate leaves the solid as nitric acid and as nitrogen oxides. Temperature within the fluidized bed are controlled by such factors as the number of U-tubes within the bed, the heat transfer coefficient for the tubing material, the temperature and rate at which the heat transfer fluid is introduced into and withdrawn from the tubes and the heat transfer properties of the heat transfer fluid as well as by the feed rate of the aqueous aluminum nitrate solution. The heat transfer fluid is preferably one which does not undergo a phase change and one which is economically priced for the quantities used. A number of heat transfer fluids are known and commercially available. One of these is NaK which is expensive and also hazardous in the event of a leak or other accident which would allow the liquid NaK to contact the air. Other heat transfer fluids include, but are not limited to, a class of aromatic mineral oils such as "Mobiltherm 600" sold by Mobil Oil Corporation and "Dowtherm" sold by Dow Chemical Company. An aormatic mineral oil is preferred in the practice of this invention.

Figure 7:
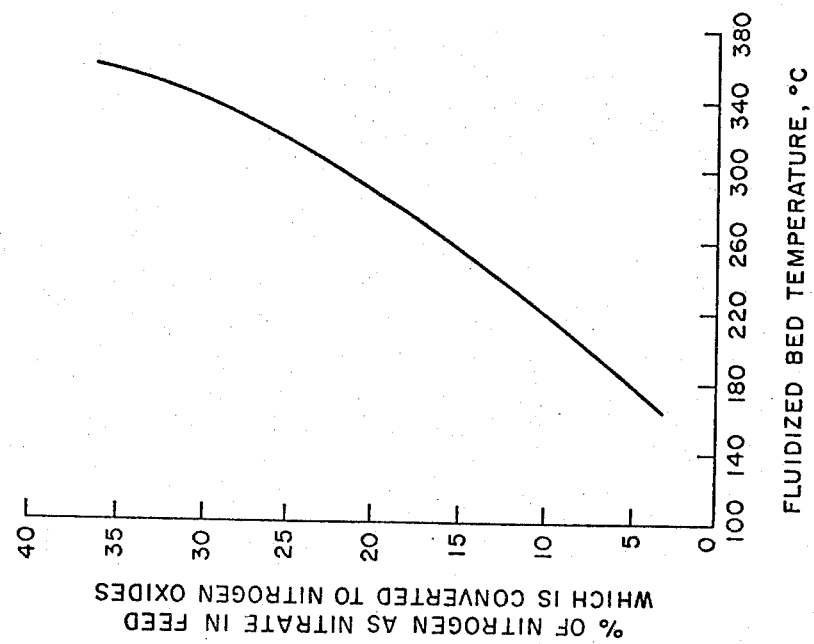
FIG. 7 is a plot showing the influence of fluidized bed temperature on the amount of nitrate values in the feed which is decomposed to the nitrogen oxides.

The temperature of the bed has a direct bearing on the amount of nitric acid formed in the decomposition. Examination of FIG. 7, which is a plot of the percent of nitrogen as nitrate of the aluminum nitrate feed which is converted to nitrogen oxides in the fluidized bed when operating over an optimum water vapor content range, illustrates the very rapid rise in the extent of decomposition which occurs with increasing bed temperature. Inasmuch as it is desired to maintain the amount of nitrate thus decomposed below the 10 percent level, it is preferably to maintain the fluidized bed particles at a temperature such that the dry solid product which forms thereon remians within the temperature range of between 200° and 210°C.

Figure 8:
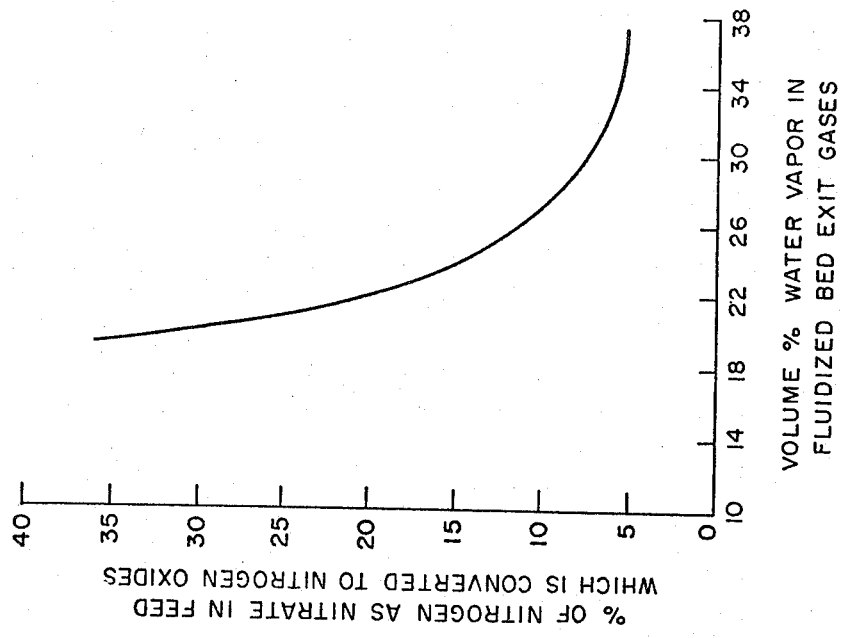
FIG. 8 is a plot showing the influence on the amount of water vapor in the fluidized bed exit gases on the amount of nitrate values in the feed which is decomposed to the nitrogen oxides.

The amount of water present in the fluidized bed effluent is also important in controlling the amount of nitric acid formed. FIG. 8 is a plot showing the weight percent of the nitrate values in the aluminum nitrate feed, when operating over an optimum temperature range, which is decomposed to the oxides of nitrogen as a function of the volume percent of the water vapor in these fluidized bed gases. Again, if the amount of nitrate in the feed decomposed to the oxides of nitrogen is to be kept about 10 percent or lower, then it is necessary to maintain the volume percent of water vapor in the fluidized bed gases above about 25 percent. In the method of this invention this requirement offers no problem since sufficient water of decomposition is present to fulfil this requirement and some steam is added as a supplementary fluidizing gas. It is apparent from FIG. 8 that an excess of water vapor in the fluidized bed gases has little or no effect on the attainment of the high nitric acid/nitrogen oxides ratios sought.

Although the concentration of the aluminum nitrate feed solution may vary over a relatively wide percentage range, it is preferable, as noted above, to use the solution resulting from dissolving the nonahydrate crystals in their water of hydration. The aluminum nitrate feed solution is preferably introduced into the fluidized bed at an elevated temperature, e.g., about 80°C. Both the flow rate of aluminum nitrate feed solution into the bed and the fluid velocity of the bed particles will be maintained at optimum rates consistent with well-known and accepted fluidized bed practice.

The fluidized bed will generally be operated at atmospheric pressure and it is desirable that the residence time of the nitric acid vapor be maintained at a minimum to prevent any decomposition of the vapor. In the fluid bed this prompt withdrawal occurs automatically in that the nitric acid vapors leave in the tail gases.

The surface characteristics of the bed particles appear to exercise some influence on whether or not the dry solid product withdrawn from the bed is a finely divided friable material suspended in the exhaust gases or is in the form of small pebble-like particles. It will generally be preferable to start the fluidized bed operation using alumina particles. As the bed continues to operate these particles assume the same composition as the product material, i.e., a hydrolyzed aluminum nitrate with a small amount of nitrate content. If the bed particles are essentially nonporous in character, the dry solid product is normally in a finely divided state and a major portion of it is withdrawn with the exhaust gases through line 15 and then separated within a cyclone separator. If, however, the bed particles are at least somewhat porous in nature the dry solid product will build up on these particles and a major portion of it may be withdrawn by way of the bed overflow line 16. In normal practice the dry product will be removed both through overflow line 16 and suspended in the exhaust gases.

Figure 4:
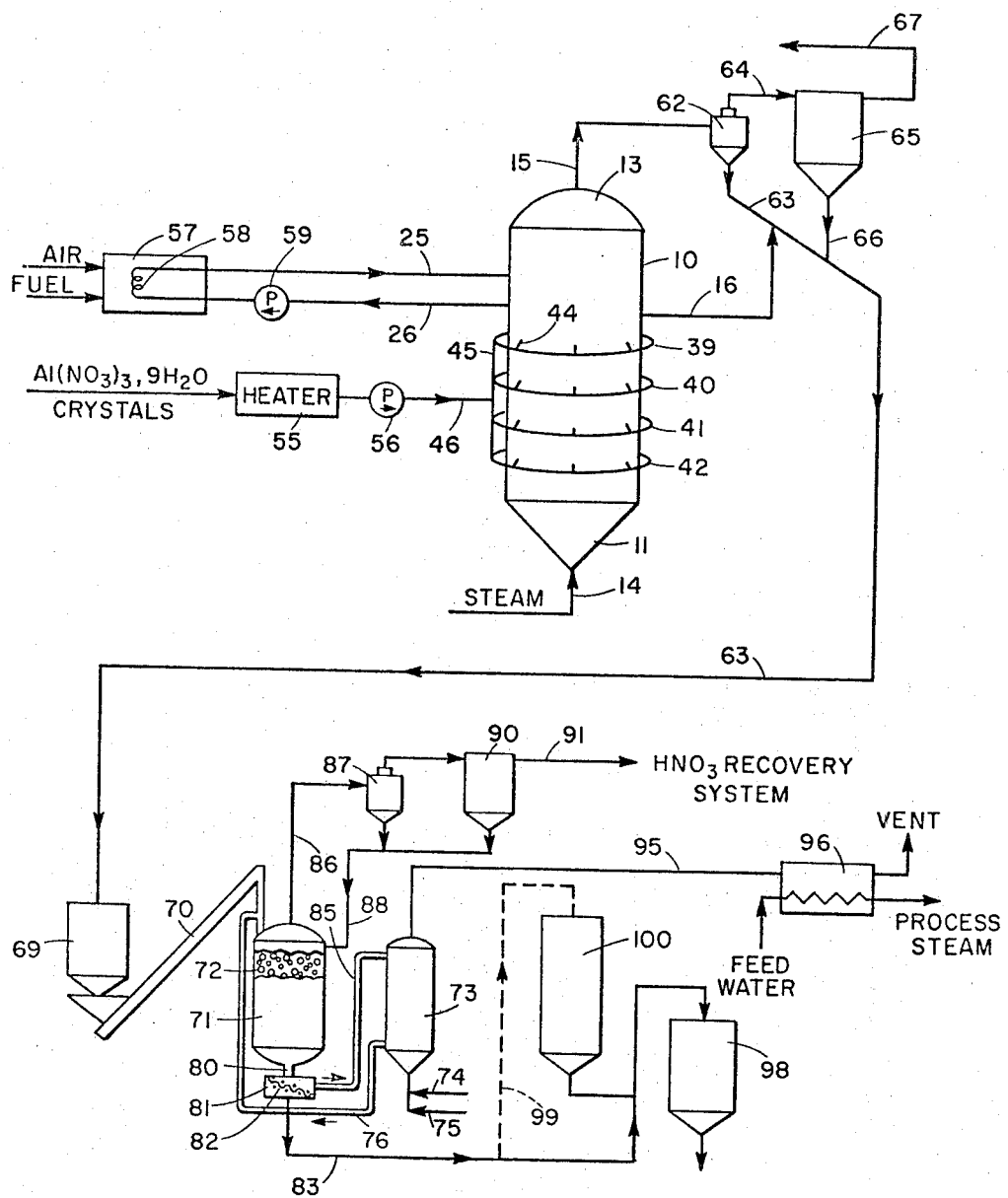
FIG. 4 is a schematic drawing illustrating the fluidized bed of FIG. 1 incorporated into the apparatus of this invention.

FIG. 4 is illustrative of the manner in which the fluidized bed apparatus of FIG. 1 is integrated into a system for forming alumina from an aluminum nitrate feed solution. In FIG. 4 like reference numerals are used to refer to like components shown in FIGS. 1 and 2. The feed solution is formed by heating pure $Al(NO_3)_3 \cdot 9H_2O$ in heater 55 to about 80°C to dissolve the crystals in their water of hydration. The feed liquid is then pumped under pressure by a pump 56 to main feed line 46 which delivers it to the nozzle system described in connection with FIG. 1. Heater 57 is adapted to burn whatever fuel is used, e.g., coal, bunker C oil, etc., with air for heating the heat transfer fluid pumped through coils 58, or other suitable forms of tubing, by pump 59 which provides the necessary force to circulate the heat transfer fluid throughout the closed system which includes the circular inlet and outlet headers and U-tubes within the fluidized bed (FIG. 1).

The fluidized bed gases above the bed particles are withdrawn through discharge line 15. The exit gases bearing some finely divided product comprise nitric acid, a small quantity of nitrogen oxides and water vapor. The fine powder product is carried by these discharged gases to a cyclone separator 62 from which the solid product is transferred by means of line 63 into a storage bin 69. The gases exhausted from cyclone separator 62 are carried by means of line 64 into a suitable filter 65 which removes any residual dry product for transfer by way of discharge line 66 to the storage bin. The off-gases, free of particulate material, are withdrawn for processing through line 67. The processing of these off-gases will be described in detail with reference FIG. 6.

The solid product material discharged to storage bin 69 contains some residual nitrate values which must be removed and most of the gamma-alumina contained in the solid bed product must be converted to alpha-alumina. In the apparatus of FIG. 4, the fluid bed product is heated to about 400°C to remove the residual nitrate. At this temperature the residual nitrate is removed primarily in the form of the oxides of nitrogen, although a minor portion of the nitrate may be in the form of nitric acid vapor which can be condensed directly. The alumina produced in this heating step will normally be primarily alpha-alumina and hence it will require no further heating. If a portion of the alumina is, however, in the gamma form, then it may be caused to undergo an autogenous phase transformation into alpha-alumina by storage in an insulated silo.

In the apparatus embodiment of FIG. 4 the fluidized bed product from storage bin 69 is conveyed by suitable conveying means 70 (e.g., a conveyor belt) into a moving bed heater. Suitable pebbles 72, such as alumina pebbles, are heated in a pebble heater 73 through contact with combustion gases which result from the reaction between air and fuel introduced into the heater 73 through lines 74 and 75. The heated pebbles are then conveyed through conduit 76 from the bottom of heater 73 into the top of moving bed heater 72 where they come in contact and mingle with the dry product from the fluidized bed. As the pebbles 72 move downwardly they transfer heat to the dry product; driving off a small quantity of $HNO_3$ and decomposing the remaining nitrate present in the dry product to the oxides of nitrogen. The alimina thus formed is removed through discharge conduit 80 to be conveyed to a separator 81 containing a suitably sized screen 82 which permits the final alumina product to pass therethrough and to enter product discharge line 83. The pebbles are retained on screen 82 and returned through conduit 85 to the top of the pebble heater 73 for reheating and recycling.

The exhaust gases from heater 71 are taken by means of line 86 into a cyclone separator 87 from which the fine dry product is returned by means of line 88 into the moving bed heater 71. The exhaust gases which are primarily oxides of nitrogen are then introduced into a filter 90. Any very fine product material which is removed by the filter is also returned to the moving bed heater 71 while the cleaned exhaust gases are discharged by line 91 to a suitable nitric acid recovery system. The nitric acid recovered in this system is preferably added to the nitric acid vapor recovered from the fluidized bed and recycled for leaching the aluminum from the clay. The off-gases from the pebble heater 73 are withdrawn through line 95 and used in a waste heat boiler 96 to make process steam.

If the product alumina discharged from moving bed heater 71 is alpha-alumina, then it is taken directly to product storage bin 98. If it contains any appreciable amount of gamma-alumina then it is conveyed by way of line 99 into a thermally insulated silo 100 where it is stored for a sufficient time to undergo an exothermic autogenous transformation to the alpha form. Other methods are also known in the art for converting gamma-alumina to alpha-alumina. Among such methods is calcining at about 1000°C. (See for example U.S. Pat. No. 2,833,622.) Subsequent to its conversion to the alpha form, the alumina is withdrawn from silo 100 to product storage bin 98.

Figure 5:
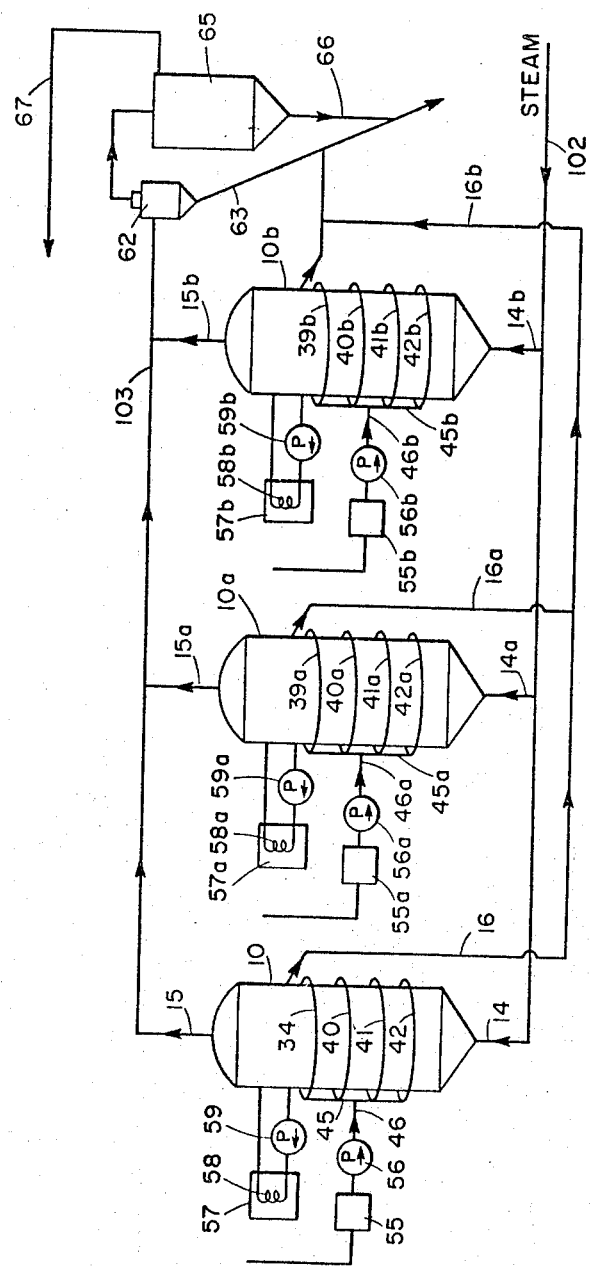
FIG. 5 is a schematic drawing illustrating one modification of the apparatus of this invention using multiple fluidized beds of FIG. 1 in parallel.

FIG. 5 illustrates the use of three fluidized beds operated in parallel. In this drawing like reference numerals are used to identify like components in FIG. 4. These numerals for the second and third fluidized beds are followed by "a" or "b" for ease of identification. In the embodiment of FIG. 5, steam from an outside source is brought in through main line 102 and connected through steam inlet line 14, 14a and 14b to the three fluidized bed. The off-gases, with any fine product material, are withdrawn through a common drawoff line 103 connected to drawoff conduits 15, 15a and 15b. In all other respects, each fluidized bed operates as an individual unit. The combined product obtained from the three fluidized beds is handled in the same manner as described in connection with FIG. 4.

Figure 6:
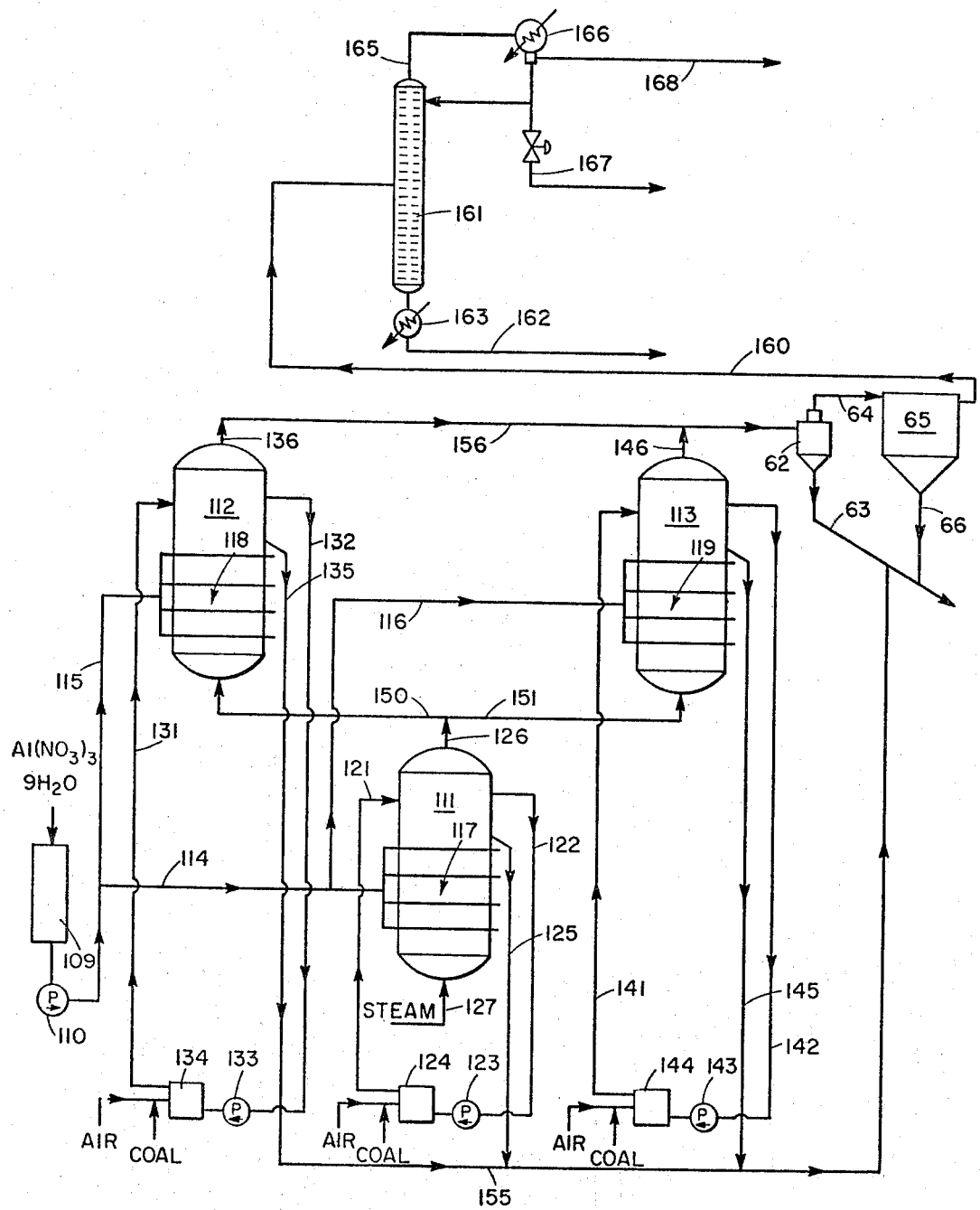
FIG. 6 is a schematic drawing illustrating another modification of the apparatus of this invention using multiple fluidized beds partly in parallel and partly in series and the nitric acid recovery system of the apparatus.

It is, of course, within the scope of this invention to operate any number of fluidized beds completely in parallel or partially in parallel and partially in series. FIG. 6 illustrates one preferred embodiment of the method and apparatus of this invention in which three fluidized bed are operated in the latter mode. In this embodiment the liquid feed solution is divided among three fluidized beds and each bed has its own liquid heat transfer fluid system. However, the off-gases from one of the beds (fluidized by the addition of steam) are used as the fluidizing gases for the other two beds.

In the apparatus of FIG. 6 the pure aluminum nitrate nonahydrate crystals are heated in heater 109 to form a feed solution which is delivered by pump 110 to the three fluidized beds 111, 112 and 113 through branch feed lines 114, 115 and 116, respectively. Each bed has a feed and nozzle system, such as shown in FIG. 1, generally identified by the reference numerals 117, 118 and 119, respectively. Fluidized bed 111 has a heat transfer fluid inlet line 121 and outlet line 122, a pump 123 and a heat transfer fluid heater 124 fired in this embodiment by coal and air. Solid product is discharged through conduit 125 while the off-gases are withdrawn through line 126. Steam for fluidizing the particles in bed 111 is introduced through line 127 and is furnished from an external source.

In a similar manner fluidized bed 112 has a heat transfer fluid inlet line 131 and outlet line 132, a pump 133 and a heat transfer fluid heater 134. Solid product from bed 112 is discharged through conduit 135 while the off-gases are withdrawn through line 136. Likewise, fluidized bed 113 has a heat transfer fluid inlet line 141 and outlet line 142, a pump 143 and a heat transfer fluid heater 144. Solid product from bed 113 is discharged through conduit 145 while the off-gases are withdrawn through line 146.

The off-gases, containing any fine product material, from bed 111 are used to fluidize beds 112 and 113 and so gas discharge line 126 from bed 111 communicates with fluidizing gas inlet lines 150 and 151 associated with beds 112 and 113, respectively. If the three fluidized beds 111, 112 and 113 are all the same size, then the steam fed into bed 111 as a fluidizing gas is sufficiently supplemented, as far as gas volume and flow rate are concerned, by the products of thermal decomposition ($H_2O$, $HNO_3$ and small amounts of nitrogen oxides) to provide fluidizing gases for two more reactors. Additional, externally-supplied steam may be added to lines 150 and 151 if required. It is, of course, possible to continue such pyramiding, using the off-gases from fluidized beds 112 and 113 to fluidize additional beds. It is also within the scope of this invention to so adjust the size (cross sectional area and bed depth) of beds arranged in series for fluidization so that a smaller bed may be used to precede a larger bed, or a larger bed may be used to precede more than two smaller beds. In such in-series bed arrangements it is preferable to adjust the sizes of the beds furnishing fluidizing gases and of the beds receiving such fluidizing gases so that the amount and flow velocity of the gases from the first bed (or beds) are sufficient to supply all of the fluidizing gases required by the second bed or beds. Since it is necessary to supply steam to only the first bed, e.g., bed 111 of FIG. 6, the series bed arrangement makes it possible to realize important savings in energy input.

The solid product material withdrawn through discharge lines 125, 135 and 145 is taken by way of a common discharge line 155 through line 63 to a storage bin such as bin 69 of FIG. 4. The off-gases from beds 112 and 113 are conveyed by a common discharge line 156 to a cyclone separator 62 where the fine product is separated for discharge into line 63 and the gases are conveyed by line 64 to filter 65. The fines from filter 65 are conveyed by line 66 to main product line 63 through which the bed product material is taken to bin 69 for treatment in the same manner as described in connection with FIG. 4.

Since the solids-free off-gases from filter 65 contain no noncondesnible products of combustion and only a very small amount of noncondensible oxides of nitrogen, they may be taken by line 160 directly to a nitric acid concentration tower 161 which may be constructed as a plate distillation column in accordance with well-known practice. The gases reaching the nitric acid concentration tower are superheated and no external heat energy need be supplied to effect the desired concentration of the nitric acid. In contrast to this, if large quantities of noncondensible gases were present as they would be in a directly fired fluidized bed, it would be necessary to first cool the off-gases, condense out the water and nitric acid in a precondenser and then reheat them to effect the desired nitric acid concentration. Thus by the method of this invention the precondenser is eliminated and a major saving in heat energy is realized.

The concentrated nitric acid withdrawn through line 162 from tower concentrator 161 is cooled in cooler 163 and sent to storage for use in leaching calcined clay. The water from the tower concentrator is removed by line 165, cooled in condenser 166 and separated from the noncondensible oxides of nitrogen. A portion of the water is returned to tower 161 as reflux and the remainder is withdrawn through value-controlled line 167. The gaseous oxides of nitrogen are withdrawn from condenser 166 and carried by line 168 to nitric acid recovery plant to be formed into nitric acid along with the oxides of nitrogen formed in the final heating step, i.e., in the travelling bed heater 71 of FIG. 4.

Although the noncondensible nitrogen oxides make up less than one percent by volume of the fluidized bed offgases, their recovery has economic significance. In the previous process this recovery of nitrogen oxides was not possible since they were part of the large quantity of noncondensibles which had to be separated out and discarded. Nitric acid is recovered by a conventional process by converting the oxides of nitrogen to nitric acid. Makeup nitric acid, lost in the process, is made by supplementing this reaction with NO and $NO_2$ formed by reacting oxygen and ammonia. Thus ammonia is an important raw material required. In treating clay to form alumina by the general process described, approximately one third of the nitric acid loss occurs in the leaching step while about two-thirds has been due to the discarding of the oxides of nitrogen with the noncondensibles. In the method of this invention, however, practically all of these oxides of nitrogen are recovered for making nitric acid. This in turn reduces the amount of ammonia required to about one-third that previously needed in a system using directly heated fluidized beds.

The following example is meant to be illustrative only and in no way should it be construed as limiting the fluidized beds to such exemplary dimensions and operational performance given. Assuming that it is desired to product 910 tons per day of alumina suitable for reduction to aluminum metal, it will be necessary to use a total feed of 3760 tons of 56.7 percent aluminum nitrate feed solution. Three fluidized beds are used as shown in FIG. 6. Each bed would have an I.D. of about 24 feet and the total height of about 45 feet. The bed depth would be 30 feet and would be heated by a heat transfer fluid circulated in 60 parallel U-tube passes each having a diameter of 4 inches and a length of 390 feet. Using "Mobiltherm 600" as the heat transfer liquid, it would be necessary to circulate 6000 gallons per minute through the U-tubes, entering at 315°C and leaving at about 250°C. The initial fluidization of the bed particles in the first fluidized bed (e.g., bed 111 of FIG. 6) would require 69,000 pounds of steam per hour and no compressor or vapor recycle systems would be needed. If the parallel bed arrangement of FIG. 5 were used, then each bed would require 69,000 pounds of steam per hour.

It will be seen from the above detailed description of the method and apparatus of this invention that the objects set forth are attained, for by using an indirectly heated fluidized bed system the handling of a large volume of noncondensible gases is completely done away with and the equipment for separating the condensibles from them is eliminated. Moreover, the noncondensible nitrogen oxides which were previously lost are recovered, thus materially reducing the amount of ammonia feed required. Since the heat transfer fluid may be heated by any fuel system including coal and fuel oil, the cost of supplying energy to the system is reduced, resulting in a major reduction in the cost of the alumina. The net result is the production of aluminum metal from clays at a cost which compares favorably with that for making aluminum from such high-grade ore as bauxite.

it will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

We claim:

1. A method of decomposing a concentrated aqueous aluminum nitrate solution to form a solid alumina product and nitric acid comprising the steps of
    a. providing at least two separate beds of fluidizable particles each of said beds having a plurality of vertically oriented spaced tubing sections extending therethrough;
    b. continuously circulating a heat transfer fluid through said tubing sections of each of said beds whereby said bed particles are heated by said heat transfer fluid by indirect heat exchange through the walls of said tubing sections;
    c. introducing an aqueous solution of aluminum nitrate beneath the surface of each of said beds in a manner to prevent any appreciable amount of said liquid aluminum nitrate from impinging directly onto the surfaces of said tubing sections;
    d. fluidizing said bed particles of one of said beds with steam;
    e. using the off-gas effluent from said one bed fluidized with steam as the fluidizing gas for the remaining of said beds;
    f. maintaining the temperature of said heat transfer fluid within a temperature range such that said liquid aluminum nitrate solution is substantially instantaneously heated to a temperature between about 150° and 300°C as it contacts the surface of said bed particles;
    g. removing the solid product from each of said fluidized beds; and
    h. withdrawing the effluent off-gases containing nitric acid from said remaining of said fluidized beds.

2. A method in accordance with claim 1 wherein said aqueous solution of aluminum nitrate is introduced in the form of atomized liquid droplets.

3. A method in accordance with claim 1 wherein said aqueous solution of alumina nitrate is introduced at at least two bed levels and at a plurality of points around each of said beds at each level.

4. A method in accordance with claim 1 including the steps of separating said effluent off-gases into nitric acid and water vapor containing noncondensible oxides of nitrogen and subsequently condensing said water vapor thereby recover said oxides of nitrogen.

5. A method in accordance with claim 1 incuding the step of heating said solid product removed from said fluidized beds to remove any residual nitrate values therefrom.

6. A method in accordance with claim 5 wherein said heating of said solid product comprises heating said product to about 400°C and collecting said residual nitrate values as off-gases.

7. A method in accordance with claim 5 including the step of converting any gamma-alumina in said solid product to alpha-alumina.

8. A method of converting a concentrated aqueous aluminum nitrate solution to alpha-aluminum and nitric acid, comprising the steps of
    a. providing at least two separate beds of fluidizable particles each of said beds having a plurality of vertically oriented spaced tubing sections extending therethrough;
    b. continuously circulating a heat transfer fluid through said tubing sections of each of said beds whereby said bed particles are heated by said heat transfer fluid by indirect heat exchange through the walls of said tubing sections;
    c. introducing an aqueous solution of aluminum nitrate in the form of atomized liquid droplets beneath the surface of each of said beds at at least two bed levels and at a plurality of points around the bed at each level in a manner to prevent any appreciable amount of said liquid droplets from impinging directly onto the surfaces of said tubing sections;
    d. fluidizing said bed particles of one of said beds with steam;
    e. using the off-gas effluent from said one bed fluidized with steam as the fluidizing gas for the remaining of said beds;
    f. maintaining the temperature of said heat transfer fluid within a temperature range such that said liquid droplets of said aluminum nitrate solution are substantially instantaneously heated to a temperature between about 150° and 300°C as they contact the surface of said bed particles;
    g. removing the solid product from said fluidized beds;
    h. heating said solid product removed from said fluidized beds to remove any residual nitrate values therefrom;
    i. withdrawing the effluent off-gases containing nitric acid from said fluidized bed; and
    j. separating said effluent off-gases into nitric acid and water vapor containing noncondensible oxides of nitrogen and subsequently condensing said water vapor thereby to recover said oxides of nitrogen.

9. A method in accordance with claim 8 wherein said heating of said solid product in step (i) comprises heating said product to about 400°C and collecting said residual nitrate values as off-gases.

10. A method in accordance with claim 8 including the step of converting any gamma-alumina in said solid product to alpha-alumina.

* * * * *